UNITED STATES PATENT OFFICE.

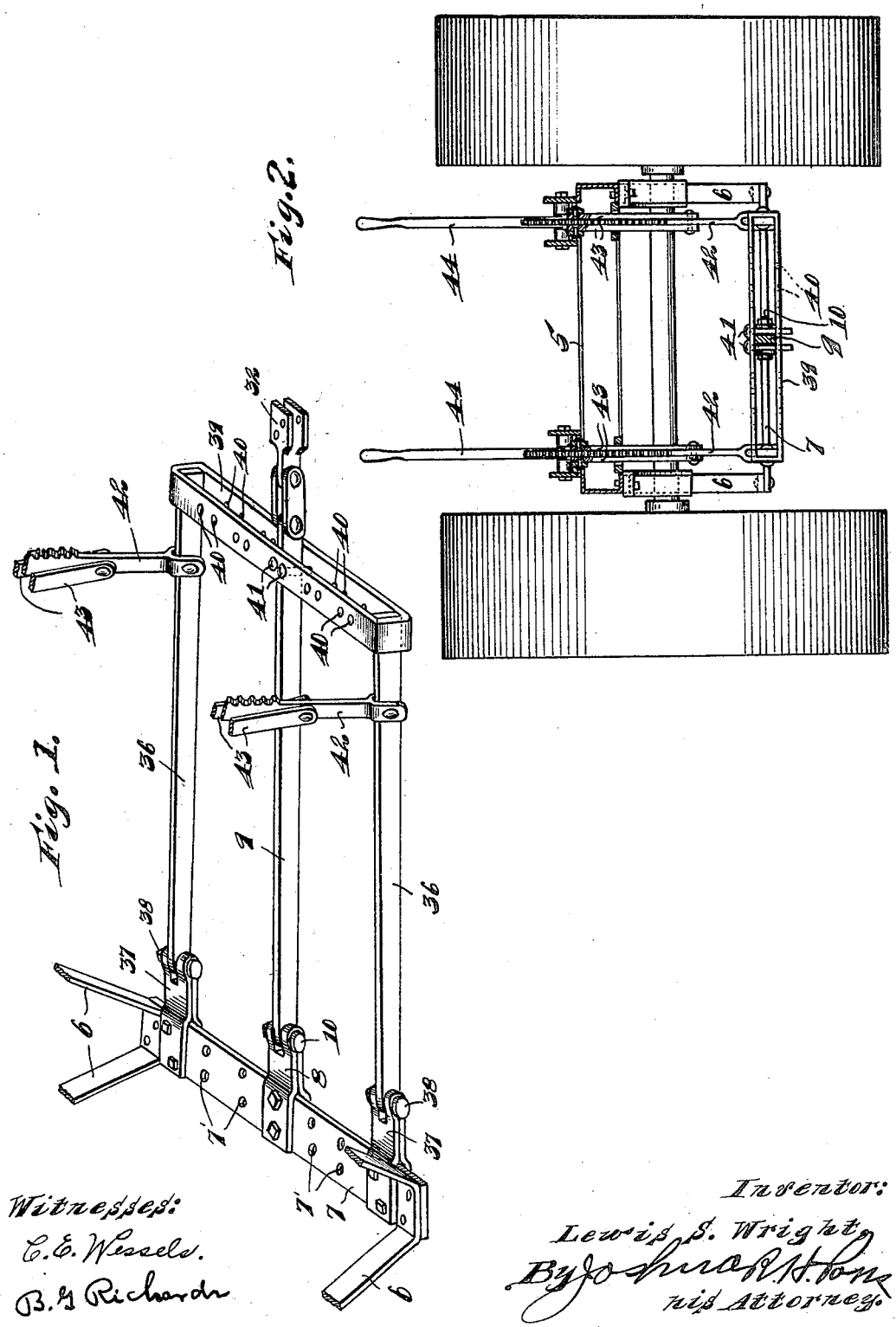

LEWIS S. WRIGHT, OF PEORIA, ILLINOIS.

TRACTOR HITCH.

1,407,365.  Specification of Letters Patent.  Patented Feb. 21, 1922.

Application filed September 4, 1917. Serial No. 189,588.

*To all whom it may concern:*

Be it known that I, LEWIS S. WRIGHT, a citizen of the United States, and a resident of the city of Peoria, county of Peoria, and State of Illinois, have invented certain new and useful Improvements in Tractor Hitches, of which the following is a specification.

My invention relates to improvements in draw bars for tractors, and has for its object the provision of an improved construction of this character, especially adapted for use with plows, harrows, discs, wagons, or other harvesting implements.

The invention consists in the combinations and arrangements of parts hereinafter described and claimed.

The invention will be best understood by reference to the accompanying drawings forming a part of this specification, and in which, Fig. 1 is a perspective view of the tractor bar frame, and Fig. 2 is an end view of the invention, partly in section, showing the draw bar in position on a tractor frame.

The preferred form of construction as illustrated in the drawings consists of a tractor bar and tractor bar frame adapted to be attached to a tractor frame of any usual or desired construction as shown at 5 in the drawings. The tractor bar frame preferably is provided with brackets 6 which are adapted to be secured to the underside of the tractor frame 5. A cross bar 7 is secured to the brackets 6, said cross bar preferably having a plurality of bolt holes 7' therein, adapted to be adjustably engaged by a bracket 8 which is secured centrally to said cross bar 7. A traction bar 9 is pivoted to said bracket by means of a bolt 10 to swing vertically with reference to the tractor frame 5.

Side bars 36 are pivotally connected at their forward ends to the cross bar 7 by means of brackets 37 and 38. The rear ends of said side bars 36 are connected by a loop 39 which is provided with pairs of bolt holes 40 adapted to receive bolts 41, positioned on opposite sides of traction bar 9 as shown. By this arrangement a traction frame is provided for the traction bar 9, which is capable of swinging vertically to permit adjustment of the traction bar, and in which the traction bar is itself laterally adjustable, thus permitting adjustments to suit various conditions of operation of the tractor. The traction bar 9 may have a suitable bracket for attachment to the implement to be drawn thereby, such as a pivoted bracket 32 as shown in the drawings.

The rear end of the traction bar frame 7 may be supported in any suitable manner on the tractor frame, bars 42, lniks 43 and levers 44, being shown, this construction forming no part of my invention.

While I have illustrated and described the preferred forms of construction for carrying my invention into effect, these are capable of variations and modifications without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a tractor frame of depending brackets thereon; a cross bar secured to said brackets; a bracket adjustably secured to said cross bar; a traction bar pivotally connected at its forward end to said adjustable bracket; side bars pivotally connected at their forward ends to said cross bar in axial alinement with the traction bar pivot; a loop connected to the rear ends of said side bars and embracing said traction bar, said loop being provided with pairs of bolt holes; and bolts arranged to be passed through said bolt holes on opposite sides of said traction bar, substantially as described.

2. The combination with a tractor frame, of a tractor bar frame pivotally mounted at its forward end in said tractor frame to swing vertically; a tractor bar extending longitudinally through said tractor bar frame, said tractor bar being pivotally connected with said tractor frame at its forward end with its pivot in transverse registration with the bar frame pivot; and means at both the forward and rearward ends of said tractor bar for laterally adjusting the same with reference to said tractor frame, substantially as described.

In testimony whereof I have signed my name to this specification in the presence of two subscribing witnesses.

LEWIS S. WRIGHT.

Witnesses:
ARTHUR A. OLSON,
B. G. RICHARDS.